US009552344B2

(12) United States Patent
Allen et al.

(10) Patent No.: US 9,552,344 B2
(45) Date of Patent: *Jan. 24, 2017

(54) PRODUCING VISUALIZATIONS OF ELEMENTS IN WORKS OF LITERATURE

(71) Applicant: International Business Machines Corporation, Armonk, NY (US)

(72) Inventors: Corville O. Allen, Durham, NC (US); Scott Robert Carrier, Durham, NC (US); Eric Woods, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 271 days.

This patent is subject to a terminal disclaimer.

(21) Appl. No.: 14/094,911

(22) Filed: Dec. 3, 2013

(65) Prior Publication Data
US 2015/0154290 A1    Jun. 4, 2015

(51) Int. Cl.
*G06F 17/30* (2006.01)
*G06F 17/24* (2006.01)
*G06F 17/22* (2006.01)

(52) U.S. Cl.
CPC ......... *G06F 17/241* (2013.01); *G06F 17/2241* (2013.01); *G06F 17/30716* (2013.01)

(58) Field of Classification Search
CPC combination set(s) only.
See application file for complete search history.

(56) References Cited

U.S. PATENT DOCUMENTS

| 8,271,345 B1* | 9/2012 | Milgrom | G06Q 30/08 705/26.1 |
| 2002/0022956 A1 | 2/2002 | Ukrainczyk et al. | |
| 2005/0257400 A1 | 11/2005 | Sommerer et al. | |
| 2006/0229896 A1* | 10/2006 | Rosen | G06Q 10/1053 705/321 |

(Continued)

OTHER PUBLICATIONS

Nowell, L. et al.; "Graphical encoding for information visualization: an empirical study"; IEEE Symposium on Information Visualization 2002; INFOVIS 2002 Proceedings; pp. 43-50; IEEE Computer Society; 2002.
Nowell, L.T.; "Graphical encoding in information visualization"; Human Factors in Computing Systems, CHI 97 Extended Abstracts, pp. 65-66; 1997.
Ross Jr., D. et al.; "Computer-Aided Study of Literary Language"; http://www.ip.com/pubview/IPCOM000131345D; Nov. 10, 2005.

(Continued)

*Primary Examiner* — Shyue Jiunn Hwa
(74) *Attorney, Agent, or Firm* — Robert H. Frantz; Reza Sarbakhsh

(57) ABSTRACT

A visualization of literary elements of a work of literature, such as a novel or short story, is generated from meta-data records representing a digital work of literature including literary elements (humor, drama, adventure, etc.), characters, and plot devices related to a position within the work of literature where each appears. A significance level is determined for each of the elements, characters and plot devices at each position within the work of literature, and these are plotted into a sequential graph having position (e.g. timeline) axis and a significance level axis. The sequential graph is then output for printing or display. Human-generated and machine-generated meta-data may be ingested equally well by the method. Colors, line thickness, and a broken line patterns may be employed for greater visual (Continued)

Timeline through literature segments

Legend/Key:
❶ literature descriptor 1 (e.g. humor)
❷ literature descriptor 2 (e.g. environmental imagery)
❸ literature descriptor 3 (e.g. character mood)
❹ literature descriptor 4 (e.g. suspense)
❺ literature descriptor 5 (e.g. plot device)

meaning. And, the sequential graph may be annotated according to segments (e.g. chapters, sections) and dominant genre within each segment.

13 Claims, 6 Drawing Sheets

(56) References Cited

U.S. PATENT DOCUMENTS

| | | | |
|---|---|---|---|
| 2010/0070448 A1* | 3/2010 | Omoigui | H01L 27/1463 |
| | | | 706/47 |
| 2010/0228693 A1 | 9/2010 | Dawson et al. | |
| 2011/0066970 A1 | 3/2011 | Burrier et al. | |
| 2011/0110599 A1 | 5/2011 | Sata et al. | |
| 2011/0199380 A1 | 8/2011 | Budiu | |
| 2012/0330869 A1* | 12/2012 | Durham | G06N 5/022 |
| | | | 706/16 |
| 2013/0166042 A1 | 6/2013 | Sharma et al. | |
| 2014/0258301 A1 | 9/2014 | Misra et al. | |
| 2015/0106022 A1* | 4/2015 | Gotz | G06F 19/3443 |
| | | | 702/19 |

OTHER PUBLICATIONS

Anonymous; "A method for visualizing graphical model during a merge operation"; http://priorartdatabase.com/IPCOM/000199666; Sep. 14, 2010.
Anonymous; "A Generic Method for Correlating Formatted Lines of Plain Text to Structured Graphical Elements to Enable Visualization Updates"; http://priorartdatabase.com/IPCOM/000215526; Mar. 6, 2012.
Wikipedia; "Glossary of Literary Terms", retrieved on Apr. 26, 2013 from http://en.wikipedia.org/wiki/List_of_literary_terms.
Wikipedia; "Literary Technique", retrieved on Apr. 26, 2013 from http://en.wikipedia.org/wiki/Literary_technique.
Bim; Applicant's reply submitted on Jan. 13, 2016 to office action mailed on Oct. 13, 2015 in U.S. Appl. No. 14/489,652, filed Aug. 18, 2015 by applicant IBM (inventor Allen).
USTPO; second office action mailed on Apr. 6, 2016 in U.S. Appl. No. 14/489,652, filed Aug. 18, 2015 by applicant IBM (inventor Allen).
USTPO; second office action mailed on Apr. 7, 2016 in U.S. Appl. No. 14/094,889, filed Dec. 3, 2013 by applicant IBM (inventor Allen).

* cited by examiner

PRODUCING VISUALIZATIONS OF ELEMENTS IN WORKS OF LITERATURE

CROSS-REFERENCE TO RELATED APPLICATIONS (CLAIMING BENEFIT UNDER 35 U.S.C. 120)

None.

FEDERALLY SPONSORED RESEARCH AND DEVELOPMENT STATEMENT

None.

MICROFICHE APPENDIX

Not applicable.

INCORPORATION BY REFERENCE

None.

FIELD OF THE INVENTION

This invention relates to the fields of producing visual representation of textual information, and especially to complex works of literature.

BACKGROUND OF INVENTION

Works of literature, such as novels, short stories, textbooks and even legal reference books, contain complex relationships between their elements such as the organization of information, the relationship between the characters presented in the literature, and a plot line within the work of literature.

For works which are more narrative in nature, such as novels and short stories, the plot is a story line which is populated not only with characters and their interactions, but also with information such as natural events, descriptions of scenery, as well as elements such as humor, mystery, suspense, drama, action, struggles, birth, death, betrayal, etc. For works which are more referential, such as textbooks and references books, there characters who are the contributing authors as well as cited authors, and the plot line corresponds to the organization or sequence of presentation of information. All of these types of works of literature can be viewed in segments, such as chapters, or even just in blocks of literature such as page ranges.

As a consumer, whether an avid novel reader or a professional or student using a reference book, one becomes aware of one's preferred content and presentation sequence. For this reason, there is a vast array of novel writing styles as well as reference book formats. One novel consumer may prefer mild humor strewn throughout a drama (e.g. "romantic comedy") that has at least a small resolution of conflict within each chapter, for example. Another novel consumer may prefer mystery and intrigue, organized initially as separate plotlines which become entangled with each other in the later segments.

For reference works, one consumer may prefer a sequentially-organized presentation of information which starts with an introduction to a subject (e.g. field of science, area of law, etc.), and presents deeper and more detailed information progressively in each chapter, wherein a final chapter is virtually cryptic except to experts in the field.

SUMMARY OF THE INVENTION

The methods and systems disclosed herein generate a visualization of literary elements of a work of literature, such as a novel or short story, from meta-data records representing a digital work of literature including literary elements (humor, drama, adventure, etc.), characters, and plot devices related to a position within the work of literature where each appears. A significance level is determined for each of the elements, characters and plot devices at each position within the work of literature, and these are plotted into a sequential graph having position (e.g. timeline) axis and a significance level axis. The sequential graph is then output for printing or display. Human-generated and machine-generated meta-data may be ingested equally well by the method. Colors, line thickness, and a broken line patterns may be employed for greater visual meaning. And, the sequential graph may be annotated according to segments (e.g. chapters, sections) and dominant genre within each segment.

BRIEF DESCRIPTION OF THE DRAWINGS

The figures presented herein, when considered in light of this description, form a complete disclosure of one or more embodiments of the invention, wherein like reference numbers in the figures represent similar or same elements or steps.

DETAILED DESCRIPTION OF EMBODIMENT(S) OF THE INVENTION

Figure 1A:
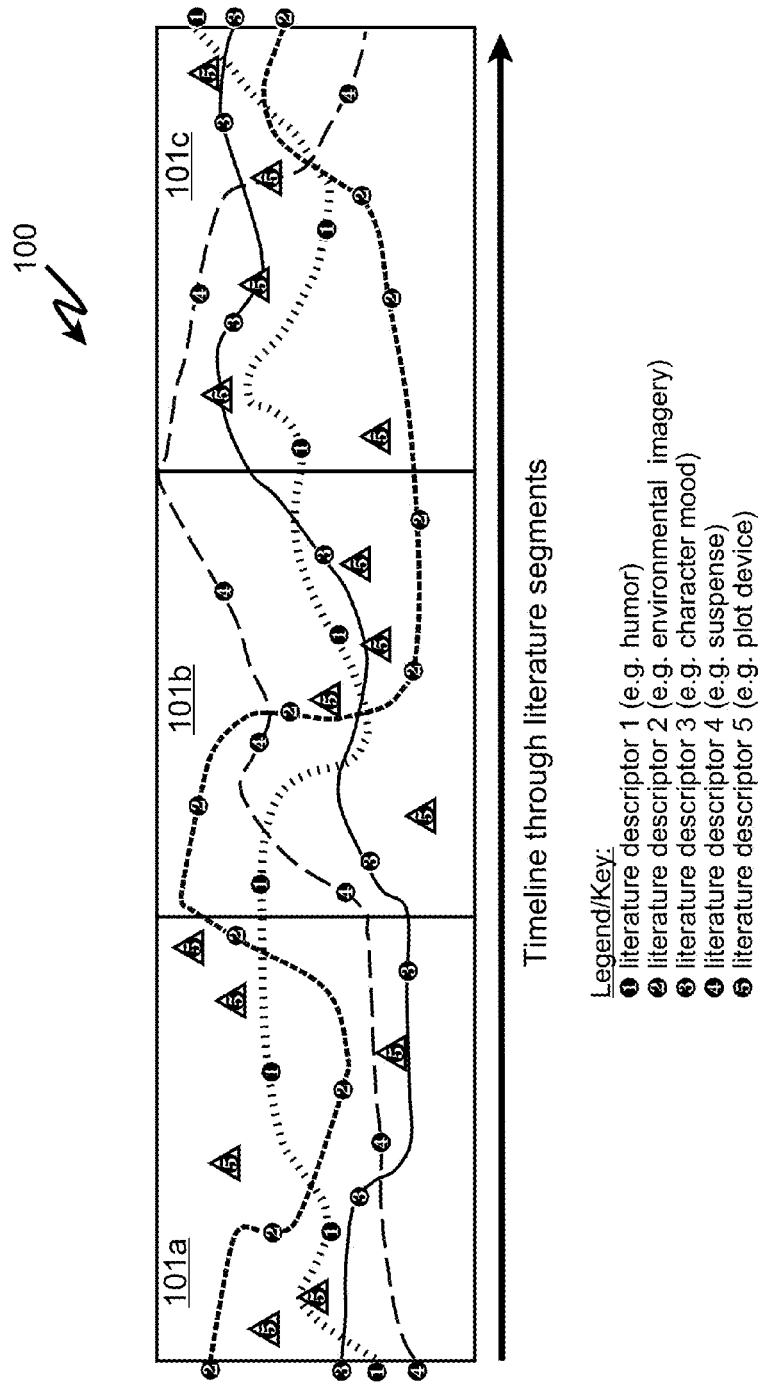
FIGS. 1a-1c illustrate in a black-and-white format the visualization output of a process or system according to the present invention.

The present inventors have recognized a problem and opportunity not yet noticed or discovered by those skilled in the relevant arts. The previously mentioned complexities of works of literature and consumer preferences are not easily matched with any available technology. Consumers are relegated to shopping for works of literature from the same author or from the same reference book publisher as their previously preferred books in the hope that the new works will be similar. They are often disappointed with the author or publisher tries a new approach, eliminates a favorite character, or experiments with a new style or organization of information. Thus, authors and publishers with established consumer bases find themselves locked into the successful writing styles, and other authors and publishers find difficulty attracting new consumers.

Review of the Available Technologies

In the process of developing the present invention, the inventors first tried to locate suitable technologies that would allow an author or publisher to quickly and efficiently communicate the complexities of a work of literature to a consumer, and for the consumer to know the same about a new work of literature. Ideally, such a technology would represent the plot line, interactions of the characters, and various preferred literary elements (humor, mystery, drama, etc.) in a manner that does not spoil the story, but which allows a consumer to know if he or she might like the new work of literature.

Currently there doesn't appear to be an available, convenient and easy way to visualize and know what type of content is contained in a novel or book and the way certain literary elements flow throughout the book. One must have a general understanding of a genre, such as sci-fi, suspense, or drama, and one may can get an impression of the content of a work of literature based on user reviews about the work.

But one cannot readily view the writing style, the elements within the book (e.g. "how humorous", "how descriptive", etc.), and how descriptive to certain elements (setting, character, location, food, mind-set) etc. There isn't a quick way to gauge how these elements play out in segments in the book and whether they are prevalent through the book and would match your type of reading interests. The only reasonable way to get somewhat accurate understanding of a book is Cliff™ notes, a NY Times review, other reader reviews, or a collation of reviews by pulling information from readers.

None of these available methods, however, appear to have an easy to comprehend, visual representation of the book content. Therefore, the inventors have discovered that there is a need in the art, not recognized yet by those skilled in the art, for a way to allow a person or system to get a visual representation of the literary elements and tone of the book or flow and content type of literature, showing where it fluctuates or is prevalent throughout the literature, in order to allow potential readers or consumers to better understand what kind of literature it is.

For example, one available technology is described in pre-grant published patent application US2010/0185984 by Wright. To the best of our understanding, this disclosure deals with visualizing temporal and spacial data based on events and people in different physical locations at a particular time, shown in a bar-graph format. However, the Wright visualization does not seem to relate to a timeline and literary elements (e.g. how happy, how mysterious, etc.) in a work of literature.

Another available technology is described in pre-grant published patent application US2007/0132767, also by Wright, which generates stories in time and space and for analysis of story patterns in an integrated visual representation on a user interface. However, Wright's visualization in this disclosure appears to create more of a geographical representation of a storyline, which does not indicate to a viewer how the story changes over time with respect to the intensity of drama, intensity of humor, intensity of mystery, etc., to the best of our understanding.

Another available technology is described in pre-grant published patent application US2009/0063412 to Harris which finds emotional literary elements in text and maps them to main characters in the text. It registers these emotional reactions as positive or negative and monitors shifts in the characters emotional state. It plots or draws the emotional elements for a negative or positive classification in a diagram, but the representation of the literary elements is only binary (positive or negative), and does not relate them to plot elements or events, to the best of our understanding.

Yet another available technology is described in pre-grant published patent application US2009/0248399 to Au, which finds emotional literary elements in text and maps them to main characters in the text. It then registers these emotional reactions as positive or negative and monitors shifts in the characters emotional state. It plots or draws the emotional elements for a negative or positive classification in a diagram. It, too, does not appear to relate these elements of information to the plot line in a visual manner, as far as we can tell.

Our New Visualization and Process

Having found no suitable process or method which meets our objectives, we now present one or more embodiments of an invention which represents various narrative elements in a visual graph by analyzing and capturing the literary elements, levels of detail, and interesting categories of data. The produced visualization rendered is easy to understand, provided in a segmented format that is easy to comprehend as graphical elements along the story line or literature. Further, the graphical elements are backed by literary meta-data scale gathered from the text and across plot themes or category themes. The analyzed and visualized categories are flexible such that they allow different literature types to be examined and formulated in the visual literature graph. The new visualization goes beyond those of the known art by relating the intensity or significance, not just the direction of change, of one or more literary elements to at least one of the following: a timeline, a character, and a plot device.

Included in at least one embodiment of the new visual graph are the occurrences of plot devices which show how various parts of the story-line move and develop relative to one or more literary elements. An advantage of this visual graphical plot graph is to be able to distinctly quickly see the make-up in general of a book or novel. It will allow users to identify with literature much easier, because it is human readable and visual. Another advantage is the ability for publishers or authors to easily see the make-up of a book they are writing or publishing and make adjustments to the content to suit their potential readers.

Potentially, this visualization may be printed on a book, such as on the back cover, or displayed online next to a book available for purchase, to assist a potential reader or buyer in quickly determining if the book may be of interest to him or her.

Current Invention's Utility in a Larger Architecture

Figure 4:
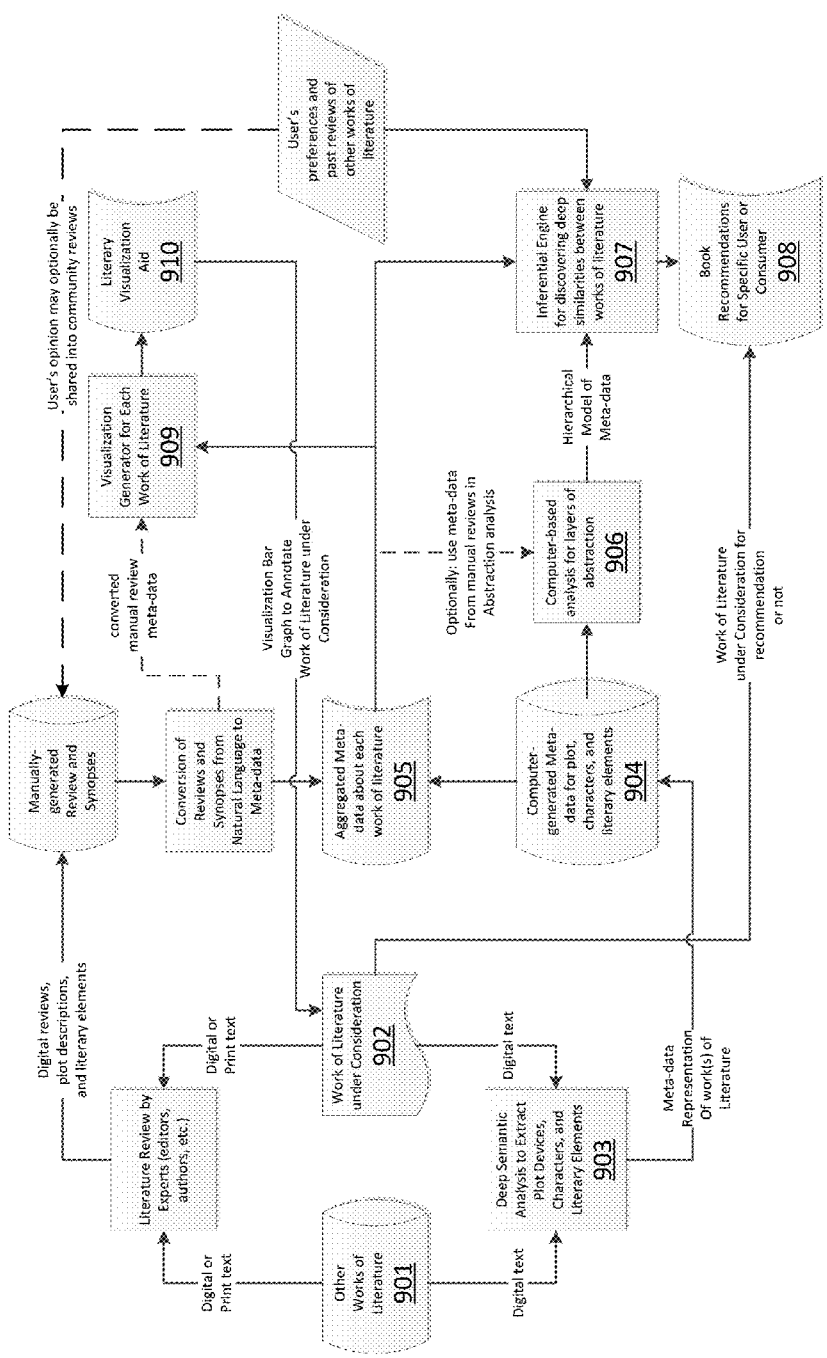
FIG. 4 depicts an arrangement of components and functions in which embodiments of the present invention will find utility.

The invention disclosed herein and several related inventions, also disclosed in U.S. patent applications by the same inventors, fit within a larger architecture for literature analysis, recommendation and annotation. Turning to FIG. 4, such an arrangement of components and elements is shown. A work of literature under consideration (902) and optionally one or more other works of literature (901) may be subjected to deep semantic analysis to extract characters, their relationships to each other and plot events, and significance or intensity of the literary elements (e.g. humor, mystery, drama, scenery, etc.). One such automated deep semantic analysis process is described in a related patent application by the present inventors. For the purposes of this invention, character, character relationships, and plot events (or plot devices) are not considered "literary elements", and are analyzed separately from literary elements. Also, in this invention, the input meta-data relating characters, plot devices, and significance levels of literary elements as utilized by the new process equally well whether the meta-data was automatically generated or manually generated. In FIG. 4, literature reviews by experts (editors, authors, etc.) can be converted to yield manually-generated meta-data, which can then be received by the visualization process (909) of the present disclosure, or merged with automatically-generated meta-data (905).

Meta-data representing the results of this analysis is stored (904), and optionally aggregated (905) with metadata which is converted from manually-created descriptions of the works of literature, such as reviews, Cliff™ notes, condensed versions of the works, etc.

In one manner of using this meta-data, which is disclosed in another related patent application, the meta-data may be further analyzed and organized (906) into hierarchical layers of abstraction to allow ready comparison with other works of literature via their abstracted meta-data representations.

In yet another manner of using this meta-data, and optionally using the abstracted models, which is disclosed in another related patent application, the meta-data and models may be used by an inferential engine (907) to discover deep similarities between two or more works of literature, and to yield one or more recommendations (908) to a potential consumer. The potential consumer's preferences may also optionally be factored into the inferential engine's analysis, as is disclosed in the related patent application.

The presently disclosed process receives the computer-generated meta-data (904), or the meta-data converted from manually-generated reviews, or a combination (905) of both, to generate (909) a visualization of the work of literature (910) which relates segments of the literature to plot events and intensity or significance of the literary elements (humor, mystery, scenery, etc.). This visualization (910) may then be used to annotate the work of literature (902) that it represents, such as printing it on the back cover of the paper book or displaying it relative to the digital book on a web page.

The Visualization

Regardless of whether the visualization is generated based upon a meta-data representation of a work of literature which was automatically or manually created, the visualization will take a general form of a bar graph as shown in FIG. 1a. Although the depictions in the present disclosure are restricted to black and white according to patent drawing rules, actual embodiments may use color, shading, and other graphical elements to convey the same information to the viewer or consumer.

In FIG. 1a, bar graph (100) has multiple segments (101a, 101b, 101c). Each segment may represent a chapter or other division of the total work of literature, as described later in this disclosure. Time in the story-line of the work of literature is represented as progressing from left to right, and one or more literary elements (humor, scenery, character mood, suspense, etc.) are shown as plotted lines progressing through the segments and through the entire bar graph. Plot elements, such as events, are also plotted relative to the time line, and preferably in a position relative to their significance.

In this example, plotted line 1 represents the literature descriptor of humor. Its intensity can be seen at any point in the novel (time corresponds to position of the left-right axis) as the distance of the line from the baseline (intensity corresponds to the up-down axis). Beginning in the first segment (101a), humor in this example starts moderately significant, grows in significance until plot element 5 (triangle), wanes a bit, and then continues to intensify into the second segment, and so forth as shown.

Now, consider plotted line 4 which represents the intensity or significance of suspense in the work of literature, which begins in the first segment (101a) less significant than humor (plot line 1), and remains less significant throughout the first segment, but then becomes more significant that humor in the second segment (101b), peaking at maximum significance at the transition from the second segment (101b) to the third segment, but ends the third segment as the least significant of the plotted literary elements (humor, imagery, and mood). One can infer from this visualization that the suspense is resolved at the end of the work of literature, which some readers may prefer. Some works of literature, however, leave suspense high with unresolved issues, as a hook to a sequel story. While some readers are OK with unresolved suspense, others may not prefer it.

As one can see from this graph, and especially if it were rendered using colored lines without circled number indicia, plot events can be readily correlated to the literary elements so that a reader can see how each element flows through each segment. Please note, however, that this visualization conveys this deep, detailed information about the work of literature without revealing the actual story itself, unlike a detailed review or synopsis which may require a spoiler alert. Thus, a first advantage of the present invention is seen.

Figure 1B:
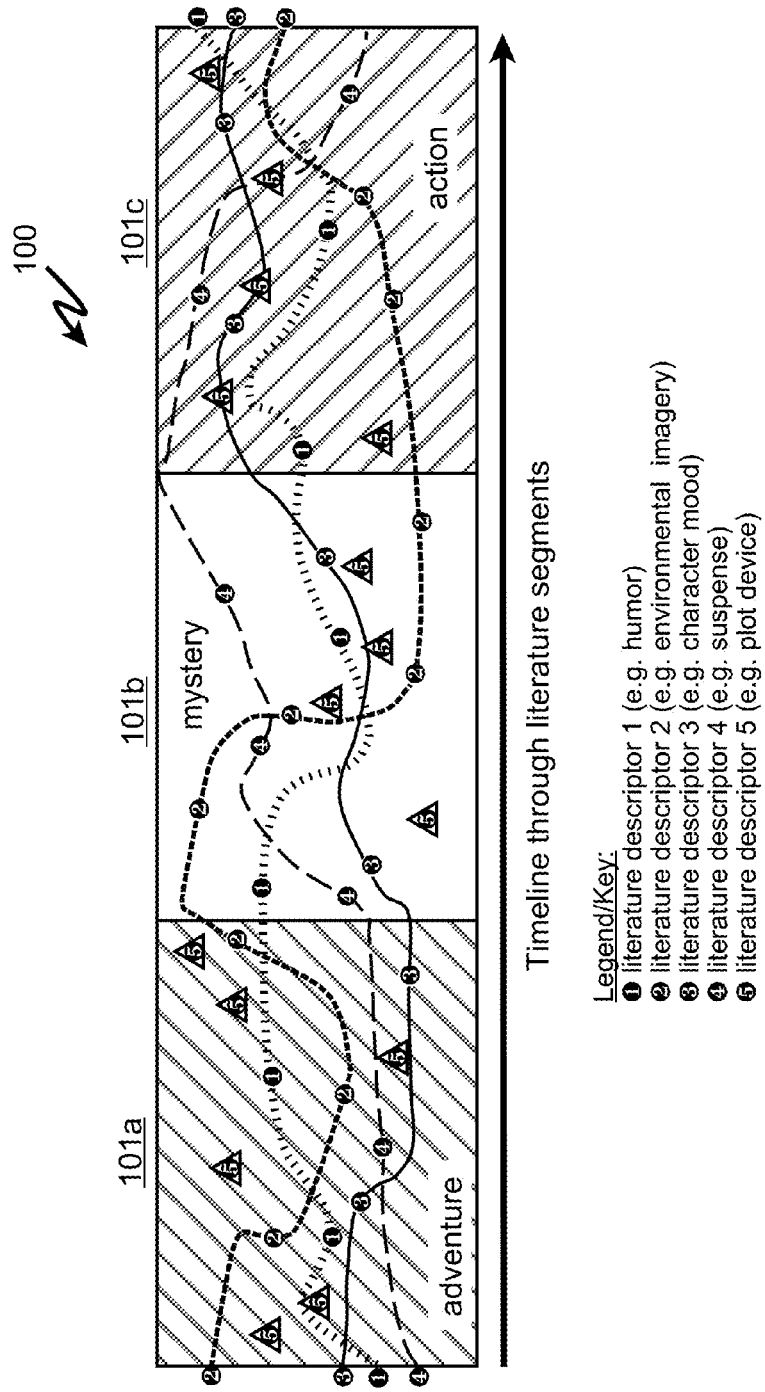

Turning now to FIG. 1b, additional information is shown compared to the bar graph of FIG. 1a. Each segment in this version is filled with a pattern, color, or both, that may be coded to the dominant genre of the segment. In this example, the first chapter (101a) may be marked to show that it is dominantly adventure, while the second chapter (101b) may be marked to show that it is dominantly mystery, and the third chapter (101c) may be marked to show that is dominantly action. With this additional information, not only can a consumer see the intensities and development of each literary element (humor, imagery, mood, suspense, etc.) relative to plot devices (events, etc.), he or she can also quickly see the sub-genres contained within the work of literature. We say "sub-genre" here because the entire work of literature may be classified for advertising and stocking purposes as only one genre, such as action, but it may actually contain segments or sections which are primarily other genres. So, where a user might not be interested in action novels, he or she may be interested in an action novel which has segments that are primarily adventure or mystery, and thus the user might purchase this work of literature. As such, another advantage of this invention is evident.

Figure 1C:
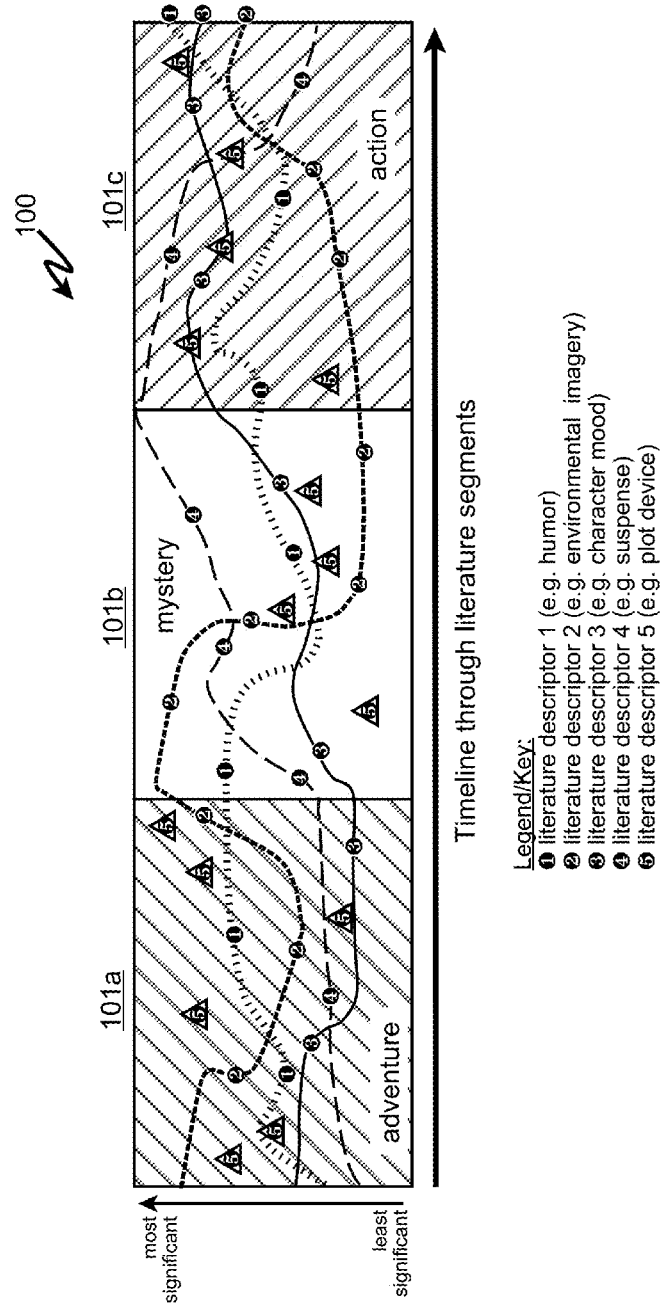

Now, turning to FIG. 1c, still further information is added to the bar graph (100) in the form of a significance scale (shown on the left end of the bar). This scale, while not needed by experienced interpreters of the visualization, may aid the novice interpreter in understanding his or her first few encounters of the visualization.

Logical Process Example

Figure 2:
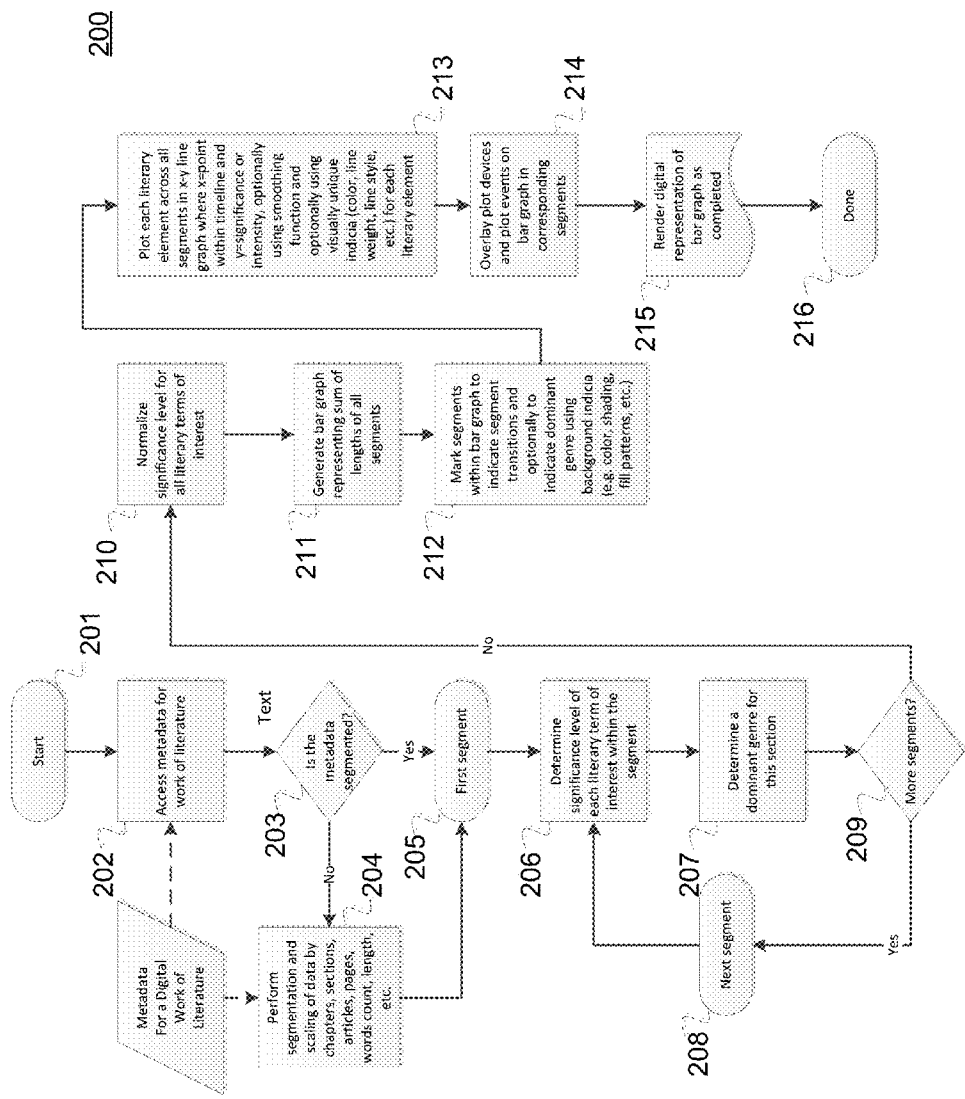
FIG. 2 sets forth a logical process according to the present invention.

Referring now to FIG. 2, we provide an example logical embodiment according to the present invention for rendering such a visualization as shown in FIGS. 1a-1c. This logical process may be committed in total or in part to program instructions, stored by a storage memory device, for execution by a processor. This logical process may also be committed in total or part to custom electronic logic circuitry, such as an integrated circuit. Combinations of program instructions and custom electronic logic circuitry may be realized, as well, without departing from the present invention.

This particular example logical process begins (201) by ingesting (202) the meta-data for a work of literature. The extraction of characters, character relationships, and plot devices, as well as the determination of significance levels of one or more literary elements is typically performed manually or automatically prior to beginning (201) the visualization generation process. These data may be converted to compatible meta-data for ingestion a logical process according to the present invention at this time, or upon starting the current process. In some embodiments, the extraction and conversion may occur concurrently with the visualization process, as well, such as the visualization process invoking or requesting extraction and conversion as it is needed.

If (203) the meta-data is not already segmented, then it is segmented (204) according to one or more segmentation schemes, such as along chapter boundaries, or by dividing the total number of pages of the work of literature into N equal length segments, etc.

Next, the first segment (205) is analyzed to determine (206) the significance level of each literary element within the segment, such as the significance of humor, of mystery, etc. From this, a dominant genre for the segment is determined (207) and recorded. One example rule for determining the dominant genre may be counting the number of sentences or paragraphs in which each literary element appears, and the genre with the greatest count is determined to be the dominant genre.

If more segments (209) are to be processed, then the next segment (208) is analyzed (206) for significant literary elements through it and a dominant genre is determined (207) and recorded for it. After the segments have been assigned dominant genres and significance level of each literary element throughout the segment has been determined, the entirety of the work (all segments) is considered, and the significance levels of the literary elements are normalized (210).

For example, referring back to FIGS. 1a-1c in which plotted line 4 representing the significance of suspense, perhaps the maximum significance level of suspense at the end of the second segment (101b) and the beginning of the third segment (101c) is a score of 119. After finding this maximum of all significance levels on all segments, the normalization process would proportionally adjust all significance scores to range from 0 to 100, where 119 was scaled down to 100. So, for this example, all scores are multiplied by a factor of 100/119, or 0.84033.

Now that all the significance scores for all the literary elements are normalized across the entire work of literature (or a selected portion of it), a bar graph is generated (211) in which the plotted lines are created (213) using the legend or key indicia (colored lines, weighted lines, broken or patterned lines, etc.) for each literary element's significance as a function of time progressing through the work of literature. Segment boundaries may be marked on the graph (212) optionally, and still further, backgrounds within the segments may be shaded, colored or patterned according to a legend or key (e.g. blue for suspense, red for action, yellow for romance, orange for humor, etc.).

And, the significant plot elements, such as events or changes of scenery or location of the story, may be marked (214) on the bar graph. Here it is important to note that the events are not being plotted as a geographical sequence, such as is done in the noted available art on a geographical map, but instead, they are marked relative to the timeline. In the example embodiment of FIGS. 1a-1b, they are plotted in a vertical (up-down) position according to their significance in the story-line (shown as triangles marked with number 5). In another embodiment, their significance may be omitted, and they may simply be marked as points on the horizontal axis or using vertical markers (dashed lines, semi-transparent lines, etc.) if significance is not to be conveyed to the user.

Various embodiments of the invention may combine generation of these indicia differently, omitting some, adding others, and using different graphical techniques such as colors, patterns, shapes, etc., to convey the information.

Lastly, the visualization is rendered, such as by creating a digital image or movie file (.JPG, .PIC, .GIF, .MOV, .MP3 files, etc.), which may then be printed to paper for application to a book cover or inside leaf page, or shown in a computer screen relative to the work of literature under consideration.

Plotted Line Methods

There is a wide array of known line plotting methods which generate a smoothed curve line based upon a set of coordinate points, and which visually display multiple items relative to each other's significance levels. For example, the well-known Gartner Business Intelligence Magic Quadrant accomplishes this type of visualization.

Some works of literature follow a linear beginning-to-ending timeline, but others involve jumps in timelines, such as flashbacks and flashforwards. Still other works of literature may present different character perspectives of different timelines in a non-linear manner. Embodiments of the present invention may linearize such non-linear timelines for the purposes of arrangement for display and visualization. While linearization of a non-linear timeline may be useful for some purposes of visualization (e.g. understanding a story line such as *Cloud Atlas* by David Mitchell), it may also spoil the story for the reader and lose literary effect such as creation of wonder, intrigue, or emotion. So, other embodiments, or options within embodiments, may show a visualization with a timeline axis that does not map directly to a linear timeline, but instead maps to the actual progression of literary elements, characters, relationships and plot devices presented in the order they appear in the work of literature. Still other embodiments may allow for linearization on just one character, one relationship, one literary element, etc.

Example Source for the Meta-Data

At least one embodiment of the present invention receives meta-data from a deep semantic analyzer as shown in the architectural arrangement of FIG. 4. The Literary Element Analyzer uses natural language processing and a type analysis system around literary terms and corpora that identifies categories of literary terms and annotators to match, identify and annotate the elements with information. Including but not limited to the main characters and the frequency of the names or the point of view or perspective of the author.

The information annotated is specific to the set of literary elements required in that analysis, whether it's a novel, series of books or just a short story. For example, one embodiment for determining intensity of humor may be to analyze text to find and annotate words such as laugh, guffaws, smiles, and certain key relationships like "corner of mouth turns up" into a synonym table and mapping to a language ware based model for humor. An advanced analyzer would further provide a confidence level and a weight towards how much humor exists by the number of participants, the type of writing style used to determine and how strong the language was. For example, a "smile" is subtle humor, while a guffaw would carry more weight. Each annotation for humor is annotated with metadata, by the Literary Element Data (metadata) Capturer, also shown in FIG. 4. For example, a Humor Annotation may have tone (1-100), a type (malapropism, pun, quip, etc.), a relationship (list of characters involved, events in plot where it happens), and a weight (1-100). Further, this meta-data should indicate where in the work this appears, such as a page number, chapter number, section number, etc.

For example, consider that a malapropism is detected in the text:

John says, "Texas has a lot of electrical votes."
Mark looks at him and bursts out laughing.
John says, "Oh I mean electoral votes."

Such an analyzer would identify laughter after the text, back trace and analyze subset of text prior to the "Mark laughs" by paragraph(s) and after for entire paragraph. To analyze text for type of humor, the process would run through a fact check for Noun, possessive verb, and subject. A correction would denotes malapropism, and an identifiable pattern for malapropism would be developed that can be learned and fed into the system.

Meta-data in the form of a record for this detection might appear as such:
meta-data schema:
lit_element(#){work_name; location(line, page, section); element; type, relationships, weight}

For this example, a meta-data recording of this event may appear as the 293rd entry in a full set of metadata as such:

```
literary_element(1) { ... }
literary_element(2) { ... }
...
literary_element(293) {
    name_of_novel;
    (lines 15 - 18, pg. 3, chap. 5);
    humor;
    malapropism;
    (Mark, John, "while driving in a car");
    92 (strong)
}
...
literary_element(N) { ... }
```

Similarly for other literary elements and genres, relevant types may be applied as to the humor example above (level, relationships, weight, line/page/section, etc.). For example, Adventure may be typed as Discovery, Knowledge, Area, Excitement, Danger, or Risk. Other literary elements may include, besides humor and adventure, tragedy, revenge, romance, satire, suspense, sadness, drama, mystery, heroism, and villainy.

Element details may include environment setting, imagery, food, emotional state, character mood(s), cultural settings, and character personae.

Plot devices may include themes, tone, styles, character personae, and devices. Here, we refer to a plot device as is a means of advancing the plot in a story, often used to motivate characters, create urgency or resolve a difficulty. This can be contrasted with moving a story forward with narrative technique, that is, by making things happen because characters take action for solid, well-motivated reasons. Types of plot devices may be events (e.g. encounters, fights, romantic interludes, chases, journeys, storms, etc.), time changes, location changes, jumping backwards in time, leaping forwards in time, etc.

Genres may include adventure, action, mystery, social drama, fantasy, comedy, horror, romance, thriller, etc.

These are not exhaustive lists, of course, but they are meant to provide the present reader an illustration of how flexible the meta-data representations are for covering a wide variety of works of literature and their content.

Suitable Computing Platform

The preceding paragraphs have set forth example logical processes according to the present invention, which, when coupled with processing hardware, embody systems according to the present invention, and which, when coupled with tangible, computer readable memory devices, embody computer program products according to the related invention.

Regarding computers for executing the logical processes set forth herein, it will be readily recognized by those skilled in the art that a variety of computers are suitable and will become suitable as memory, processing, and communications capacities of computers and portable devices increases. In such embodiments, the operative invention includes the combination of the programmable computing platform and the programs together. In other embodiments, some or all of the logical processes may be committed to dedicated or specialized electronic circuitry, such as Application Specific Integrated Circuits or programmable logic devices.

Figure 3:
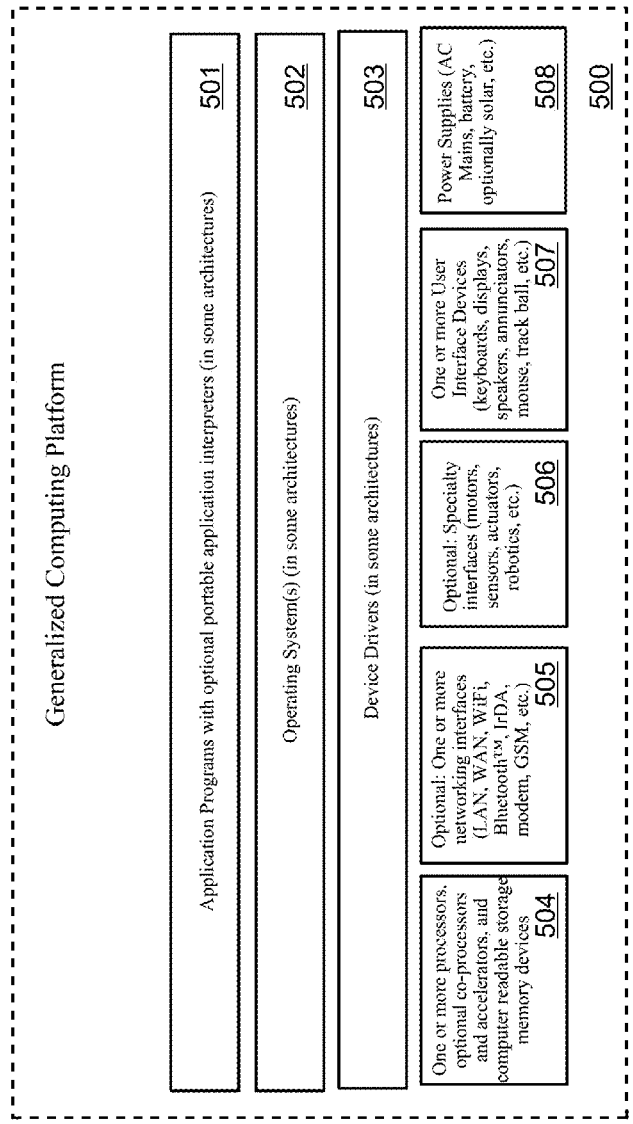
FIG. 3 illustrates a generalized computing platform suitable for combination with program instructions to perform a logical process such as shown in FIG. 3 to yield a computer system embodiment according to the present invention.

The present invention may be realized for many different processors used in many different computing platforms. FIG. 3 illustrates a generalized computing platform (500), such as common and well-known computing platforms such as "Personal Computers", web servers such as an IBM iSeries™ server, and portable devices such as personal digital assistants and smart phones, running a popular operating systems (502) such as Microsoft™ Windows™ or IBM™ AIX™, UNIX, LINUX, Google Android™, Apple iOS™, and others, may be employed to execute one or more application programs to accomplish the computerized methods described herein. Whereas these computing platforms and operating systems are well known an openly described in any number of textbooks, websites, and public "open" specifications and recommendations, diagrams and further details of these computing systems in general (without the customized logical processes of the present invention) are readily available to those ordinarily skilled in the art.

Many such computing platforms, but not all, allow for the addition of or installation of application programs (501) which provide specific logical functionality and which allow the computing platform to be specialized in certain manners to perform certain jobs, thus rendering the computing platform into a specialized machine. In some "closed" architectures, this functionality is provided by the manufacturer and may not be modifiable by the end-user.

The "hardware" portion of a computing platform typically includes one or more processors (504) accompanied by, sometimes, specialized co-processors or accelerators, such as graphics accelerators, and by suitable computer readable memory devices (RAM, ROM, disk drives, removable memory cards, etc.). Depending on the computing platform, one or more network interfaces (505) may be provided, as well as specialty interfaces for specific applications. If the computing platform is intended to interact with human users, it is provided with one or more user interface devices (507), such as display(s), keyboards, pointing devices, speakers, etc. And, each computing platform requires one or more power supplies (battery, AC mains, solar, etc.).

CONCLUSION

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof, unless specifically stated otherwise.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

It should also be recognized by those skilled in the art that certain embodiments utilizing a microprocessor executing a logical process may also be realized through customized electronic circuitry performing the same logical process(es).

It will be readily recognized by those skilled in the art that the foregoing example embodiments do not define the extent or scope of the present invention, but instead are provided as illustrations of how to make and use at least one embodiment of the invention. The following claims define the extent and scope of at least one invention disclosed herein.

What is claimed is:

1. A computer program product for visualizing literary elements as a graph comprising:
   a computer readable storage memory device; and
   program instructions encoded by the computer readable storage memory device for causing a processor to:
      receive a set of meta-data records representing the contents of a digital work of literature, wherein each meta-data record comprises a significance value for a literary element and a relationship of the literary element to one or more items selected from the group consisting of a character, and a literary plot device, and a position where the literary element occurs within a literary plot of the work of literature, and wherein the receiving of meta-data records comprises at least one action selected from the group consisting of receiving converted data from human reviews, receiving converted data from synopses, and receiving meta-data created by a computer using natural language processing and deep semantic analysis;
      graph the literary elements, characters and plot devices in a sequential graph having a first axis corresponding to a progression of the literary plot within the work of literature, a second axis orthogonal to the first axis corresponds to significance level, and a plurality of points located within the sequential graph as a function of the occurrence position and significance level for each literary element; and
      render the sequential graph to an output of the computer system.

2. The computer program product as set forth in claim 1 wherein the literary element comprises one or more categories selected from the group consisting of humorous literature, suspenseful literature, mystery literature, dramatic literature, action literature, adventure literature, romantic literature, science fiction literature, science reference literature, and legal analysis literature.

3. The computer program product as set forth in claim 1 wherein the rendering to an output comprises at least one action selected from the group consisting of creating a digital image file, creating a digital movie file, printing to a printable material, and displaying on a digital display.

4. The computer program product as set forth in claim 1 wherein the graphing comprises:
   plotting a smooth curve for each literary element along a set of coordinates corresponding to each literary element;
   encoding the smooth curve to correspond to the literary element using at least one indicia selected from the group consisting of line color, line thickness, and a broken line pattern;
   breaking the meta-data records into segments of the work of literature; and
   marking the sequential graph according to the segments.

5. The computer program product as set forth in claim 4 wherein the breaking comprises one or more actions selected from the group consisting of breaking according to chapters, breaking according to sections, breaking according to number of pages, breaking according to number of paragraphs, and breaking according to shifts in subject matter.

6. The computer program product as set forth in claim 4 further comprising program instructions stored by the computer readable storage memory device for causing a processor to:
   determine a dominant genre of each segment; and
   annotate on the sequential graph according to the dominant genre corresponding to each segment.

7. A computer system for visualizing literary elements as a graph comprising:
   a processor; and
   a computer readable storage memory device; and
   program instructions encoded by the computer readable storage memory device for causing the processor to:
      receive system a set of meta-data records representing the contents of a digital work of literature, wherein each meta-data record comprises a significance value for a literary element and a relationship of the literary element to one or more items selected from the group consisting of a character, and a literary plot device, and a position where the literary element occurs within a literary plot of the work of literature, and wherein the receiving of meta-data records comprises at least one action selected from the group consisting of receiving converted data from human reviews, receiving converted data from synopses, and receiving meta-data created by a computer using natural language processing and deep semantic analysis;
      graph the literary elements, characters and plot devices in a sequential graph having a first axis corresponding to a progression of the literary plot within the work of literature, a second axis orthogonal to the first axis corresponds to significance level, and a plurality of points located within the sequential graph as a function of the occurrence position and significance level for each literary element; and
      render the sequential graph to an output of the computer system.

8. The computer system as set forth in claim 7 wherein the literary element comprises one or more categories selected from the group consisting of humorous literature, suspenseful literature, mystery literature, dramatic literature, action literature, adventure literature, romantic literature, science fiction literature, science reference literature, and legal analysis literature.

9. The computer system as set forth in claim 7 wherein the rendering to an output comprises one or more actions selected from the group consisting of creating a digital image file, creating a digital movie file, printing to a printable material, and displaying on a digital display.

10. The computer system as set forth in claim 7 wherein the receiving of meta-data records comprises one or more actions selected from the group consisting of receiving converted data from human reviews, receiving converted data from synopses, and receiving meta-data created by a computer using natural language processing and deep semantic analysis.

11. The computer system as set forth in claim 7 wherein the graphing comprises:
   plotting a smooth curve for each literary element along a set of coordinates corresponding to each literary element;
   encoding the smooth curve to correspond to the literary element using at least one indicia selected from the group consisting of line color, line thickness, and a broken line pattern;
   breaking the meta-data records into segments of the work of literature; and
   marking the sequential graph according to the segments.

12. The computer system as set forth in claim 11 wherein the breaking comprises one or more actions selected from the group consisting of breaking according to chapters, breaking according to sections, breaking according to number of pages, breaking according to number of paragraphs, and breaking according to shifts in subject matter.

13. The computer system as set forth in claim 12 further comprising program instructions stored by the computer readable storage memory device for causing the processor to:
   determine a dominant genre of each segment; and
   annotate each segment on the sequential graph according to the dominant genre corresponding to each segment.

* * * * *